UNITED STATES PATENT OFFICE.

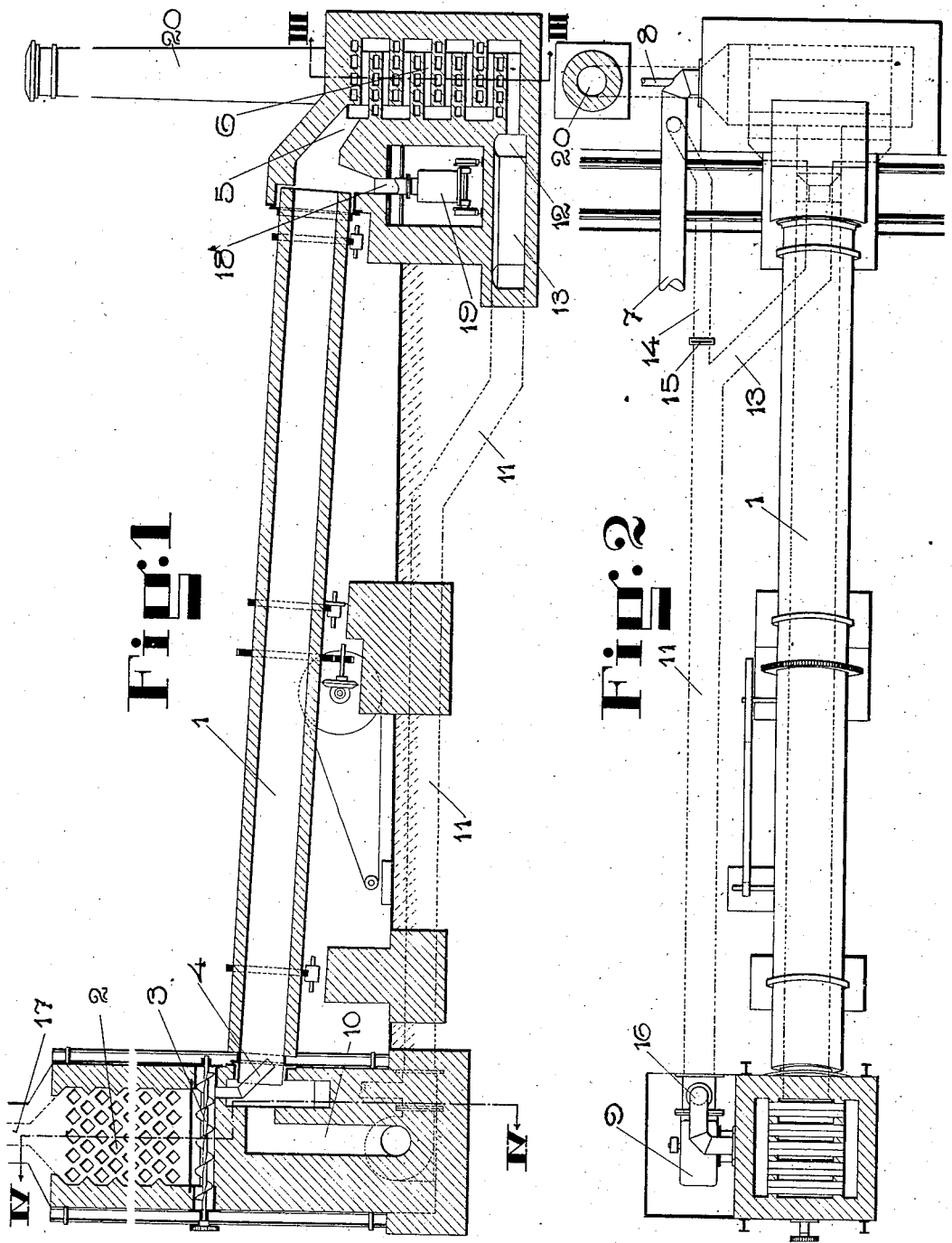

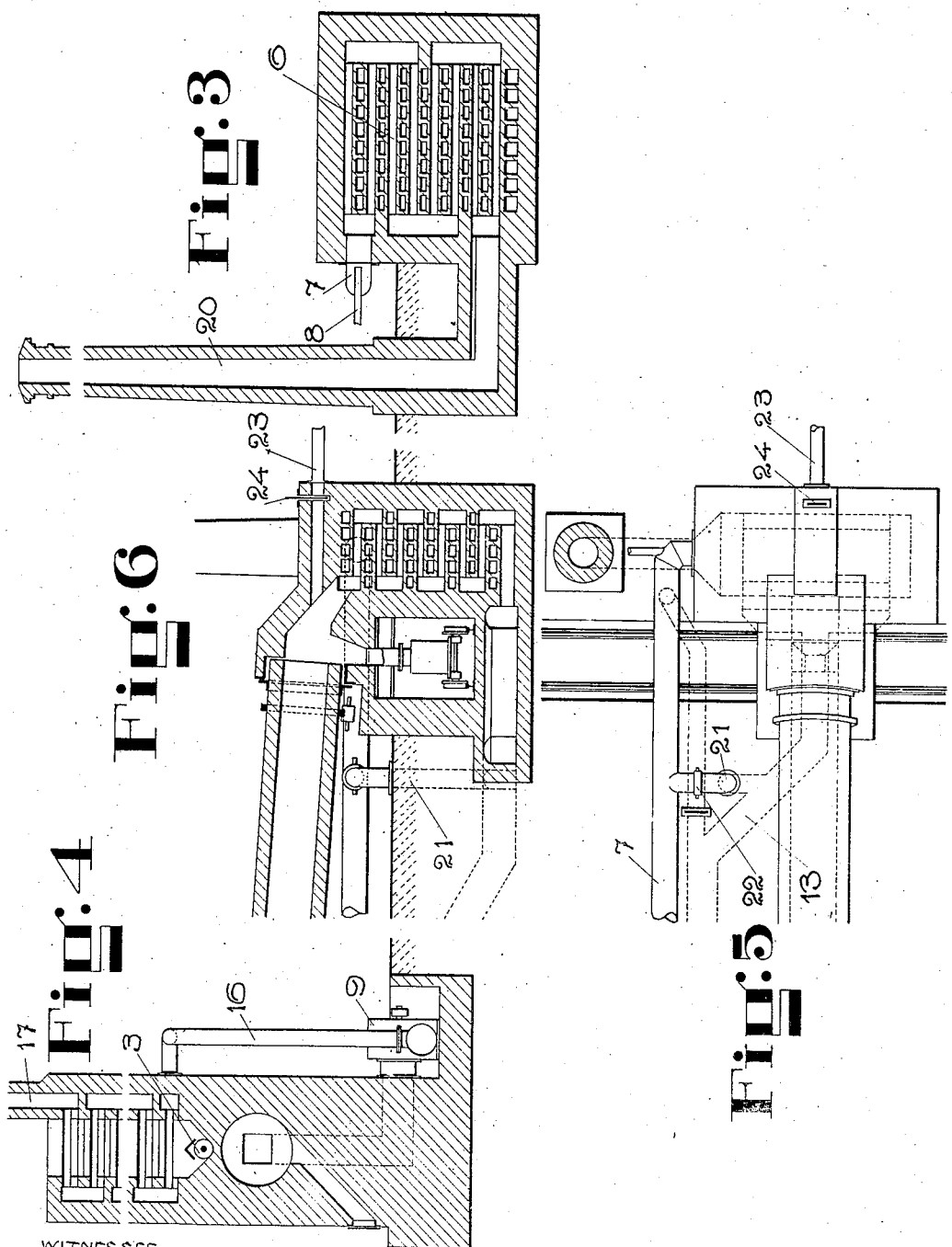

GUSTAF GRÖNDAL, OF DJURSHOLM, SWEDEN.

METHOD OF REDUCING IRON ORE.

1,033,051. Specification of Letters Patent. Patented July 16, 1912.

Application filed November 4, 1909. Serial No. 526,213.

*To all whom it may concern:*

Be it known that I, GUSTAF GRÖNDAL, a subject of the King of Sweden, and resident of Djursholm, Sweden, have invented a certain new and useful Improved Method of Reducing Iron Ore, of which the following is a specification.

If a suitable mixture of iron ore and charcoal, coke or other suitable solid carbonaceous matter hereafter referred to as carbon is heated to the necessary degree the iron is reduced under certain circumstances, completely and always more efficiently, the more finely divided or intimately mixed the raw materials are. According to my invention the heating is effected by a gas or gas mixture of the necessary temperature led directly through or over the ore-carbon mixture in a suitable furnace during a period of such length that the whole of the iron in the ore will be reduced to the metallic state, the reduced product being then removed from the furnace and allowed to cool, protected against oxidizing. A suitable proportion of carbon and ore in the said ore-carbon mixture has been found to be about 20 per cent. of carbon in proportion to the percentage of iron of the ore, provided the gas or gas mixture is such a one as to be indifferent to the process of reduction and only acts as a carrier of heat. A reducing gas or gas mixture may of course also be used. Even an oxidizing gas or gas mixture might be used, but then the percentage of carbon in the ore-carbon mixture must be increased.

For obtaining a continuous process I employ an inclined cylindrical furnace mounted and kept rotating in the usual manner. One end of the furnace communicates with a device for charging the ore-carbon mixture and its other end communicates on the one hand with a discharge for the reduced product and on the other hand with a recuperator, from which the heated gas or gas mixture comes and sweeps through the furnace. The gases produced during the reduction in the furnace consisting of carbonic oxid and carbonic acid as well as the gas or gas mixture used for heating are led from the charging end of the furnace to a fan or blower or similar apparatus and they are forced back to the recuperator and through it and after being heated to a suitable temperature say 800° C. again through the furnace. Here they are mixed with the gases generated during the continued reduction and forced back to the recuperator and through it, and so on in a continual circulation. The excess of gases arising from the addition of the gases generated during the continuous process of reduction and which is not needed for the transmission of heat, is led away and used for heating the recuperator into which it is led and where the combustible part is burned. The heating of the recuperator, however, is principally effected by a particular firing, for instance by means of generator gas. A portion of the just mentioned excess of gas may be burned in a drying apparatus and used for drying and preheating the ore-carbon mixture before feeding it into the furnace as said mixture ought to be dry.

On the accompanying drawing an arrangement of furnace for carrying out the new process in a continuous manner is shown but as an example only.

Figure 1 represents a longitudinal section of the arrangement and Fig. 2 is a plan partly in section. Fig. 3 is a section on line III—III of Fig. 1 and Fig. 4 is a section on line IV—IV of Fig. 1. Fig. 5 is a plan view of part of the apparatus showing a modified form and Fig. 6 is a part of Fig. 1 showing another modified form.

1 indicates the rotating furnace supported and rotated in a known manner. The charging end of the furnace extends into a tower, the upper part of said tower being a drying apparatus 2 for the ore-carbon mixture charged into it.

3 indicates a screw conveyer for feeding the material to a pipe 4 leading to the furnace. The other end of the furnace extends into a channel 5 made of brick work and communicating with the recuperator 6. The latter may be of any ordinary construction.

7 indicates a conduit from a gas generator, not shown, and 8 a conduit for the combustion air under pressure.

9 indicates a fan or blower, its inlet communicating through a flue 10 in the tower with the gas outlet from the furnace. The pressure conduit 11 from the blower branches and one branch 13 enters into the inlet port 12 of the recuperator 6 while the other branch 14 opens into the gas conduit 7 from the gas generator and is provided with a regulating valve 15. 16 is another conduit branching off from the pressure conduit 11 and opening into a combustion device of any suitable construction in the lower part of the drying apparatus 2. 17 indicates the chimney belonging thereto.

The pressure conduit 11 is provided with a dust collector or filtering means of any suitable kind, not shown, for preventing dust from entering into the recuperator.

18 indicates an outlet port arranged in the channel 5 for the reduced product and 19 a truck placed under it on a track. Said truck being of a known construction and of such a form that a simple luting is enough for effecting the tightening between the truck and the outlet port when required.

20 indicates the chimney of the recuperator.

If for any reason it is desired to use generator gas, i. e. reducing gas, in the furnace Fig. 5 represents an addition to the arrangement of furnace described above for this purpose. In this figure 21 indicates a conduit branching off from the conduit 7 for the gas from the generator and opening into the conduit 13 from the blower 9. 22 indicates a regulating valve in the conduit 21, by means of which the feed of generator gas may be regulated.

Fig. 6 represents an arrangement of the furnace for feeding air to the heat carrying gas mixture which takes place through the pipe 23. 24 indicates a regulating valve in this pipe. Said pipe and valve are also shown in Fig. 5.

For carrying out the process the furnace and recuperator are heated by gas firing or in any other suitable way and after their being sufficiently heated the ore-carbon mixture is charged into the furnace and the blower is set working, the process afterward continuing uninterruptedly in the manner clearly seen from the foregoing description.

When using an indifferent gas or gas mixture as heat carrier a mixture of ore and carbon suitable for the process is obtained if the carbon amounts to about 20 per cent. of the percentage of iron in the ore. If a reducing gas mixture is used the composition of the ore-carbon mixture may be the same or the percentage of solid carbon may be diminished, but when using an oxidizing gas mixture the percentage of solid carbon must be increased.

Above it has been spoken of a recuperator for heating the gas and such an apparatus has been shown on the drawing, but any other suitable heating device may be employed, and the combustion material need not necessarily be generator gas. The heating may even be effected by electricity if desired without departing from the invention.

I claim:—

1. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated and forced in unaltered condition through the furnace and brought in contact with the ore-carbon mixture.

2. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated together with other gases and forced in unaltered condition through the furnace and brought in contact with the ore-carbon mixture.

3. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated and forced through the furnace and brought in contact with the ore-carbon mixture, a portion of the excess gases from the furnace being used to heat the circulating part of the gas mixture that passes through the heating apparatus and the furnace in a continual circulation.

4. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated together with other gases and forced through the furnace and brought in contact with the ore-carbon mixture, the excess gases from the furnace being employed to heat the part of the gas mixture that passes through the heating apparatus and the furnace in a continual circulation.

5. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated and forced through the furnace and brought in contact with the ore-carbon mixture, the excess gases from the furnace being employed to heat the part of the gas mixture that passes through the heating apparatus and the furnace in a continual circulation, and also for preheating the ore-carbon mixture.

6. Method of reducing iron ore by mixing the ore in a fine state of division with finely divided solid carbon and heating the mixture in a suitable furnace directly by means of the gases developed by the reduction of the ore in the furnace, which are forced through a suitable heating apparatus and reheated together with other gases and forced through the furnace and brought in contact with the ore-carbon mixture, the excess gases from the furnace being employed to heat the part of the gas mixture that passes through the heating apparatus and the furnace in a continual circulation, and also for preheating the ore-carbon mixture.

In testimony whereof I have signed my name to this specification, in the presence of two subscribing witnesses.

GUSTAF GRÖNDAL.

Witnesses:
ANNA SÖDERSTRÖM,
C. BRODIN.